(12) United States Patent
Kume

(10) Patent No.: US 12,410,845 B2
(45) Date of Patent: Sep. 9, 2025

(54) SLIDING BUSHING

(71) Applicant: Sumitomo Riko Company Limited, Aichi (JP)

(72) Inventor: Takashi Kume, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 425 days.

(21) Appl. No.: 17/961,572

(22) Filed: Oct. 7, 2022

(65) Prior Publication Data
US 2023/0029849 A1    Feb. 2, 2023

Related U.S. Application Data

(63) Continuation of application No. PCT/JP2022/003275, filed on Jan. 28, 2022.

(30) Foreign Application Priority Data

Mar. 31, 2021 (JP) ................................ 2021-059569

(51) Int. Cl.
*F16F 1/38* (2006.01)

(52) U.S. Cl.
CPC ...................... *F16F 1/38* (2013.01)

(58) Field of Classification Search
CPC ........ B60G 2204/41; B60G 2204/4104; B60G 2204/44; B60G 2204/45; B60G 2206/73; B60G 7/04; F16F 1/387; F16F 1/3842; F16F 1/38; F16F 1/3732; F16F 1/3863; F16F 13/14; F16F 9/54; F16F 1/3835
See application file for complete search history.

(56) References Cited

U.S. PATENT DOCUMENTS

| 9,475,358 B2 * | 10/2016 | Grim | B60G 7/02 |
| 2019/0226543 A1 * | 7/2019 | Niwa | F16F 1/387 |
| 2020/0108682 A1 * | 4/2020 | Sano | F16F 1/38 |

FOREIGN PATENT DOCUMENTS

| CN | 105121894 B * | 12/2017 | ............ F16F 1/3842 |
| JP | H06323354 | 11/1994 | |
| JP | 2004353798 A * | 12/2004 | |

(Continued)

OTHER PUBLICATIONS

"Office Action of China Counterpart Application", issued on Jun. 26, 2025, with English translation thereof, p. 1-p. 13.

*Primary Examiner* — Robert A. Siconolfi
*Assistant Examiner* — Mahbubur Rashid
(74) *Attorney, Agent, or Firm* — JCIPRNET

(57) ABSTRACT

Provided is a sliding bushing in which an inner shaft member and an outer tube member are connected by a main rubber elastic body and sliding of the inner shaft member with respect to the main rubber elastic body is allowed. The inner shaft member includes a bulge part of a large diameter provided midway in an axial direction. The outer tube member includes a tapered part whose diameter decreases axially outward at both axial end portions. An outer peripheral surface of the bulge part in the inner shaft member includes a non-adhesive part that is non-adhesive to the main rubber elastic body and is allowed to slide with respect to the main rubber elastic body, and an outer peripheral surface axially outside the non-adhesive part in the inner shaft member includes an adhesive part to which the main rubber elastic body is adhered by vulcanization.

5 Claims, 2 Drawing Sheets

(56)  References Cited

FOREIGN PATENT DOCUMENTS

| | | |
|---|---|---|
| JP | 2010159860 | 7/2010 |
| JP | 2013133855 | 7/2013 |
| JP | 2015172424 | 10/2015 |
| WO | 2013099408 | 7/2013 |

* cited by examiner

SLIDING BUSHING

CROSS-REFERENCE TO RELATED APPLICATION

This application is a continuation of PCT International Application No. PCT/JP2022/003275, filed on Jan. 28, 2022, which claims priority under 35 U.S.C § 119(a) to Japanese Patent Application No. 2021-059569, filed on Mar. 31, 2021. Each of the above application(s) is hereby expressly incorporated by reference, in its entirety, into the present application.

BACKGROUND

Technical Field

The disclosure relates to a bushing used for, for example, a suspension bushing for an automobile or the like, and particularly relates to a sliding bushing in which sliding of an inner shaft member with respect to a main rubber elastic body is allowed.

Related Art

Conventionally, there is known a bushing used for a suspension bushing of an automobile or the like, as disclosed in, for example, Japanese Patent Laid-Open No. 2010-159860 (Patent Document 1). The bushing of Patent Document 1 has a structure in which a shaft member and an outer cylinder are connected by a rubber-like elastic body.

If both high spring properties in an axis-perpendicular direction and low spring properties in a torsional direction are required as in a suspension bushing, as shown in Patent Document 1, a structure may be adopted in which a first bulging part and a second bulging part are arranged concentrically by providing the first bulging part in the shaft member and providing the second bulging part in the outer cylinder.

In the suspension bushing or the like, there are also cases where low spring properties are required for an input in the torsional direction. In this case, by making the shaft member non-adhesive to the rubber-like elastic body, relative rotation between the shaft member and the outer cylinder is allowed, and the required low spring properties in the torsional direction can be realized.

However, as a result of a study by the present inventors, the following finding has been obtained. In the above-mentioned structure in Patent Document 1, when the shaft member is simply non-adhesive to the rubber-like elastic body and torsional displacement (rotation) is allowed, the rubber-like elastic body compressed between the first bulging part and the outer cylinder is likely to be deformed axially outward, and it becomes difficult to set high spring properties in the axis-perpendicular direction due to axially outward escape of the rubber-like elastic body. If relatively hard spring properties are required in the axis-perpendicular direction, there is a risk that the required properties may not be able to be satisfied.

SUMMARY

According to one aspect of the disclosure, a sliding bushing is provided which has a structure in which an inner shaft member and an outer tube member are connected by a main rubber elastic body and sliding of the inner shaft member with respect to the main rubber elastic body is allowed. The inner shaft member includes a bulge part of a large diameter provided midway in an axial direction. The outer tube member includes a tapered part whose diameter decreases axially outward at both axial end portions. An outer peripheral surface of the bulge part in the inner shaft member includes a non-adhesive part that is non-adhesive to the main rubber elastic body and is allowed to slide with respect to the main rubber elastic body, and an outer peripheral surface axially outside the non-adhesive part in the inner shaft member includes an adhesive part to which the main rubber elastic body is adhered by vulcanization.

DESCRIPTION OF THE EMBODIMENTS

Figure 1:
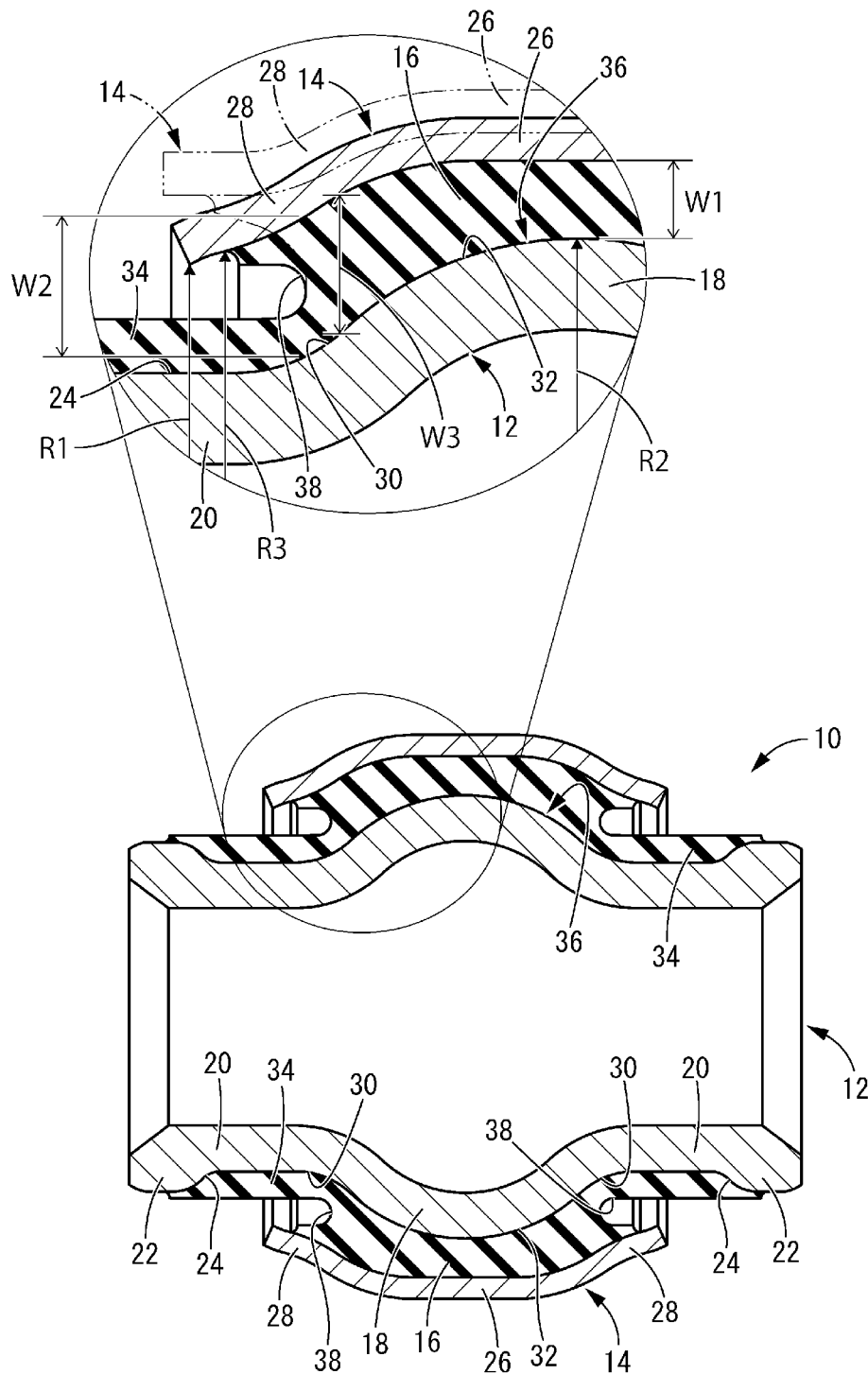
FIG. 1 is a longitudinal sectional view showing a suspension bushing as a first embodiment of the disclosure, corresponding to an I-I section of FIG. 2.

The disclosure provides a sliding bushing in which both hard spring properties in an axis-perpendicular direction and soft spring properties in a torsional direction and a prying direction can be advantageously set.

Described below are aspects for understanding of the disclosure. However, the aspects described below are exemplary and may be adopted in combination with each other as appropriate. Moreover, components described in each aspect may be recognized and adopted independently wherever possible, and may be adopted in combination with any component described in another aspect as appropriate. Accordingly, in the disclosure, various different aspects may be realized and the disclosure is not limited to the aspects described below.

According to one aspect, a sliding bushing has a structure in which an inner shaft member and an outer tube member are connected by a main rubber elastic body and sliding of the inner shaft member with respect to the main rubber elastic body is allowed. The inner shaft member includes a bulge part of a large diameter provided midway in an axial direction. The outer tube member includes a tapered part whose diameter decreases axially outward at both axial end portions. An outer peripheral surface of the bulge part in the inner shaft member includes a non-adhesive part that is non-adhesive to the main rubber elastic body and is allowed to slide with respect to the main rubber elastic body, and an outer peripheral surface axially outside the non-adhesive part in the inner shaft member includes an adhesive part to which the main rubber elastic body is adhered by vulcanization.

According to the sliding bushing having the structure in accordance with this aspect, the outer peripheral surface of the bulge part of the inner shaft member includes the non-adhesive part to which the main rubber elastic body is not adhered. By providing the non-adhesive part on the outer peripheral surface of the bulge part, sliding of the inner shaft member and the main rubber elastic body in the bulge part is allowed, and low spring properties in a torsional direction and a prying direction may be achieved.

The adhesive part to which the main rubber elastic body is adhered by vulcanization is provided axially outside the non-adhesive part on the outer peripheral surface of the inner shaft member. By providing the adhesive part axially outside the non-adhesive part, the main rubber elastic body is restrained by the inner shaft member at the adhesive part. When there is an input in an axis-perpendicular direction, axially outward deformation of the main rubber elastic body is restricted at the adhesive part. Hence, a high spring constant due to compression of the main rubber elastic body can be set in the axis-perpendicular direction. Further, by providing the tapered part at both axial end portions of the outer tube member, axially outward deformation of an outer peripheral portion of the main rubber elastic body is restricted by the tapered part. In this way, when the main rubber elastic body is compressed in the axis-perpendicular direction, in an inner peripheral portion of the main rubber elastic body, the main rubber elastic body that is likely to escape axially outward due to provision of the non-adhesive part is restrained by the adhesive part; in the outer peripheral portion of the main rubber elastic body, axially outward escape of the main rubber elastic body is restricted by the tapered part of the outer tube member. Accordingly, while the low spring properties in the prying direction and the torsional direction can be achieved due to provision of the non-adhesive part, the high spring properties in the axis-perpendicular direction can be realized.

According to another aspect, in the sliding bushing described in the above aspect, in the main rubber elastic body, a minimum thickness dimension in a radial direction of a portion located on an outer periphery of the non-adhesive part is smaller than a maximum thickness dimension in the radial direction of a portion located on an outer periphery of the adhesive part.

According to the sliding bushing having the structure in accordance with this aspect, by increasing the thickness dimension in the radial direction of the main rubber elastic body on the outer periphery of the adhesive part, a large free length of the main rubber elastic body can be ensured in a portion where it is difficult to secure durability due to the restraint by adhesion, and the durability can be improved. Meanwhile, in the main rubber elastic body located on the outer periphery of the non-adhesive part where durability is less likely to be a problem, the thickness dimension in the radial direction is reduced. When there is a vibration input in the axis-perpendicular direction, hard spring properties due to compression of the non-adhesive part are exhibited.

According to another aspect, in the sliding bushing described in any of the above aspects, a minimum inner diameter of the tapered part of the outer tube member is smaller than a maximum outer diameter of the bulge part of the inner shaft member.

According to the sliding bushing having the structure in accordance with this aspect, coming off of the inner shaft member in the axial direction with respect to the outer tube member is restricted by the bulge part and the tapered part. In addition, for example, since the main rubber elastic body is compressed between the bulge part and the tapered part when there is an input in the axial direction, hard spring properties due to a compression spring component can be achieved in the axial direction.

According to another aspect, in the sliding bushing described in any of the above aspects, a sliding layer having low friction is provided between overlapping surfaces of the non-adhesive part of the bulge part and the main rubber elastic body.

According to the sliding bushing having the structure in accordance with this aspect, since sliding of the non-adhesive part of the inner shaft member and the main rubber elastic body is allowed relatively advantageously, the low spring properties in the prying direction and the torsional direction can further be achieved.

According to another aspect, in the sliding bushing described in any of the above aspects, a recess opening on an outer peripheral surface is provided axially outside the bulge part in the inner shaft member, and the adhesive part is configured to include an inner surface of the recess.

According to the sliding bushing having the structure in accordance with this aspect, a free length of the adhesive part of the main rubber elastic body can be increased, and the durability of the adhesive part may be improved.

According to the disclosure, both hard spring properties in the axis-perpendicular direction and soft spring properties in the torsional direction and the prying direction can be advantageously set.

Embodiments of the disclosure will be described below with reference to the drawings.

Figure 2:
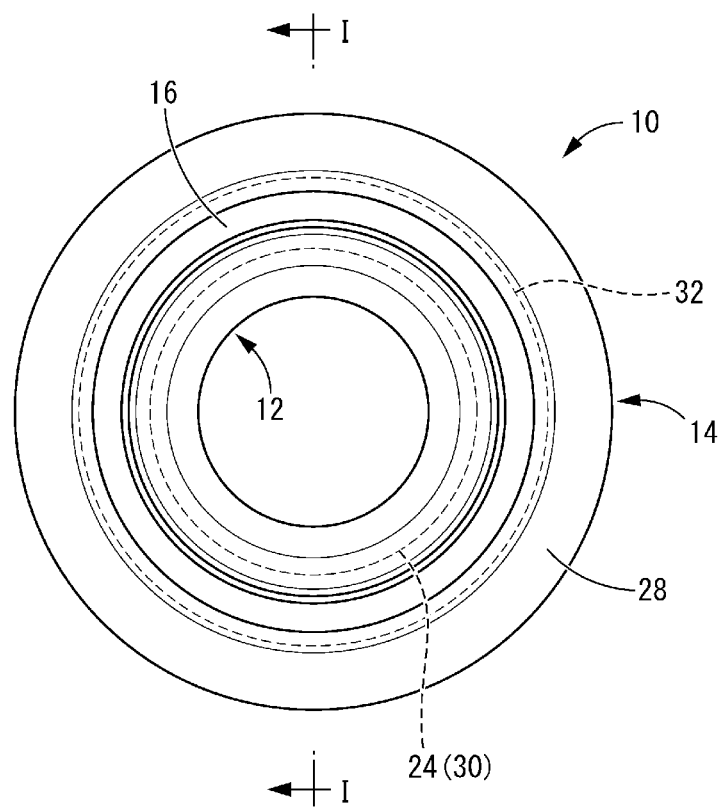
FIG. 2 is a front view of the suspension bushing shown in FIG. 1.

FIG. 1 and FIG. 2 show a suspension bushing 10 for an automobile as a first embodiment of a sliding bushing having a structure in accordance with the disclosure. The suspension bushing 10 has a structure in which an inner shaft member 12 and an outer tube member 14 are elastically connected by a main rubber elastic body 16.

The inner shaft member 12 is, for example, a high-rigidity member made of metal, and has a cylindrical shape with a small diameter as a whole. The inner shaft member 12 may have a solid rod shape or the like. In that case, a fixing structure for fixation to a suspension arm or the like may be provided, for example, at both axial ends.

The inner shaft member 12 is composed of a bulge part 18 in which an axial central portion protrudes toward an outer periphery and a diameter thereof is relatively large. The bulge part 18 has an outer peripheral surface having a substantially spherical annular shape convex toward the outer periphery. In the bulge part 18 of the present embodiment, an inner peripheral surface is a curved surface corresponding to the outer peripheral surface, and a thickness dimension is substantially constant over the entire axial direction. However, in the bulge part, the thickness dimension may also vary in the axial direction, and the inner peripheral surface may be, for example, a cylindrical surface extending straight in the axial direction.

The inner shaft member 12 has small diameter parts 20 and 20 provided axially outside the bulge part 18. The small diameter part 20 has a smaller outer diameter than the bulge part 18, and extends axially outward from an axial end of the bulge part 18. At an axial end of each small diameter part 20 opposite to the bulge part 18, a protrusion 22 protruding toward the outer periphery is provided over the entire periphery. In the small diameter part 20 of the inner shaft member 12, a recess 24 opening on an outer peripheral surface is provided over the entire periphery between the protrusion 22 and the bulge part 18 in the axial direction.

The outer tube member 14 is a high-rigidity member like the inner shaft member 12. Compared to the inner shaft member 12, the outer tube member 14 has a substantially cylindrical shape with a smaller thickness and a larger diameter, and has a shorter axial length dimension. In the outer tube member 14, an axial central portion is a cylindrical part 26 extending linearly in the axial direction, and tapered parts 28 and 28 inclined axially outward toward the inner periphery are provided on both axial sides of the cylindrical part 26. The tapered part 28 may be inclined at a constant angle with respect to the axial direction, and may also have an inclination angle varying in the axial direction. In the present embodiment, the inclination angle of the tapered part 28 with respect to the axial direction becomes smaller axially outward. The tapered part 28 may be provided in advance at the time of formation of the outer tube member 14, and may also be formed, for example, in association with later-described diameter reduction processing of the outer tube member 14.

By providing the tapered parts 28 and 28 on both axial sides of the cylindrical part 26, the outer tube member 14 has a sectional shape concave toward the inner periphery as a whole in the longitudinal section shown in FIG. 1. In the outer tube member 14, an axial dimension of the cylindrical part 26 is smaller than an axial length dimension of the bulge part 18, and an axial length dimension of the entire outer tube member 14 is greater than the axial length dimension of the bulge part 18.

The inner shaft member 12 is inserted through the inner periphery of the outer tube member 14, and the inner shaft member 12 and the outer tube member 14 are arranged concentrically. The inner shaft member 12 protrudes toward both axial sides with respect to the outer tube member 14. Both axial ends of the outer tube member 14 are located on both axially outer sides of the bulge part 18 of the inner shaft member 12. The bulge part 18 located inside the outer tube member 14 in the axial direction and the radial direction is arranged so as to be wrapped by the outer tube member 14 with a predetermined distance therebetween. A distance in the radial direction between the inner shaft member 12 and the outer tube member 14 is minimum in an axial center where the bulge part 18 and the cylindrical part 26 face each other, and gradually increases axially outward in the bulge part 18. A minimum inner diameter R1 of the tapered part 28 is smaller than a maximum outer diameter R2 of the bulge part 18. More preferably, a minimum inner diameter R3 of the tapered part 28 at an axially outer end of a portion to which the main rubber elastic body 16 is fixed is smaller than the maximum outer diameter R2 of the bulge part 18, and the main rubber elastic body 16 is continuously provided in the axial direction between axially facing surfaces of the bulge part 18 and the tapered part 28.

The inner shaft member 12 and the outer tube member 14 are elastically connected by the main rubber elastic body 16. The main rubber elastic body 16 has a cylindrical shape as a whole, and is provided to connect facing surfaces of an outer peripheral surface of the inner shaft member 12 and an inner peripheral surface of the outer tube member 14. The main rubber elastic body 16 is formed as an integrally vulcanized molded product including the inner shaft member 12 and the outer tube member 14. In the main rubber elastic body 16, in a portion arranged so as to directly fill a space between radially facing surfaces of the inner shaft member 12 and the outer tube member 14, a radial thickness dimension at both axial end portions is greater than that in the axial center. However, the main rubber elastic body 16 may also extend in the axial direction with a substantially constant radial thickness dimension.

By performing diameter reduction processing such as drawing on the outer tube member 14 after vulcanization molding of the main rubber elastic body 16, tensile stress due to thermal contraction acting on the main rubber elastic body 16 is reduced, and durability of the main rubber elastic body 16 may be improved. At the time of diameter reduction processing of the outer tube member 14, by further reducing the diameter of an axial end of the outer tube member 14, the tapered parts 28 and 28 are formed in the outer tube member 14. Accordingly, while the inner shaft member 12 can be inserted through the outer tube member 14 before molding of the main rubber elastic body 16, the minimum inner diameter R1 of the tapered parts 28 and 28 can be made smaller than the maximum outer diameter R2 of the bulge part 18 after molding of the main rubber elastic body 16. Coming off of the inner shaft member 12 with respect to the outer tube member 14 is prevented by indirect engagement between the bulge part 18 and the tapered parts 28 and 28 via the main rubber elastic body 16. By making the minimum inner diameter R3 of the portion in the tapered parts 28 and 28 where the main rubber elastic body 16 is fixed smaller than the maximum outer diameter R2 of the bulge part 18, it is possible to achieve hard spring properties due to compression of the main rubber elastic body 16 between the bulge part 18 and the tapered parts 28 and 28 when there is a vibration input in the axial direction. In FIG. 1, the outer tube member 14 before the diameter reduction processing is indicated by a two-dot chain line.

The outer tube member 14 is adhered to the main rubber elastic body 16 by vulcanization. Between overlapping surfaces of the outer tube member 14 and the main rubber elastic body 16, no sliding layer like that between overlapping surfaces of the inner shaft member 12 and the main rubber elastic body 16 is provided. Hence, when the outer tube member 14 is subjected to diameter reduction, problems such as wrinkles in the sliding layer are unlikely to occur.

The main rubber elastic body 16 is arranged in an axial region straddling the outer peripheral surface of the bulge part 18 and the outer peripheral surface of the small diameter parts 20 and 20 in the inner shaft member 12. In the main rubber elastic body 16, both axial end portions are adhered by vulcanization to adhesive parts 30 and 30 composed of the outer peripheral surfaces on both axial sides of the inner shaft member 12, and an axial central portion non-adhesively overlaps a non-adhesive part 32 composed of an outer peripheral surface of an axial central portion of the inner shaft member 12. In the main rubber elastic body 16, an axial length dimension of the portion arranged so as to directly fill the space between the radially facing surfaces of the inner shaft member 12 and the outer tube member 14 may be a length limited to being on the outer peripheral surface of the bulge part 18 of the inner shaft member 12, or may be an axial length extending from the bulge part 18 to the small diameter parts 20 and 20 extending on both axial sides.

The adhesive parts 30 and 30 are composed of the outer peripheral surface of the axial end of the bulge part 18 and the outer peripheral surface of the small diameter parts 20 and 20 constituting both axial end portions of the inner shaft member 12. In the present embodiment, the adhesive parts 30 and 30 are configured to include an inner surface of the recesses 24 and 24 of the small diameter parts 20 and 20. The adhesive parts 30 and 30 extend axially outward from the axial end of the outer tube member 14 and reach an outer peripheral surface of the protrusions 22 and 22. An inner peripheral portion of the main rubber elastic body 16 includes an inner fixing part 34 fixed to the inner surface of the recess 24. An axially inner end of the inner fixing part 34 is located axially inwardly offset from a hollow part 38. An axially outer portion of the inner fixing part 34 is located axially outside a deepest portion of the hollow part 38, and an outer peripheral surface of the axially outer portion of the inner fixing part 34 is exposed. It is desirable that the adhesive part 30 include the outer peripheral surface of the small diameter parts 20 and 20 protruding toward both axial sides of the bulge part 18.

In the present embodiment, the non-adhesive part 32 is composed of the outer peripheral surface of the axial central portion of the bulge part 18. Since the inner shaft member 12 and the main rubber elastic body 16 are non-adhesive at the non-adhesive part 32, sliding (relative displacement of the overlapping surfaces) of the inner shaft member 12 and the main rubber elastic body 16 is allowed at the non-adhesive part 32. In the present embodiment, the non-adhesive part 32 is covered with a sliding layer 36 made of a low-friction coating material, and sliding of the inner shaft member 12 and the main rubber elastic body 16 is likely to occur at the non-adhesive part 32. The sliding layer 36 is formed by a known method such as coating or vapor deposition using, for example, a known sliding coating material such as a fluororesin or molybdenum disulfide. It is desirable that the non-adhesive part 32 include the center of the bulge part 18. For example, the non-adhesive part 32 may be set to extend over a region extending from a maximum outer diameter part of the bulge part 18 toward both axial sides and axially outward of a point reaching ½ of a difference between the maximum outer diameter and a minimum outer diameter of the bulge part 18.

The outer peripheral surface of the main rubber elastic body 16 is adhered by vulcanization to the inner peripheral surface of the outer tube member 14. The main rubber elastic body 16 is fixed over an inner peripheral surface of the cylindrical part 26 and the inner peripheral surface of the tapered parts 28 and 28 in the outer tube member 14.

In the main rubber elastic body 16, a minimum thickness dimension W1 in the radial direction of a portion located on an outer periphery of the non-adhesive part 32 is smaller than a maximum thickness dimension W2 in the radial direction of a portion located on an outer periphery of the adhesive part 30. The minimum thickness dimension W1 in the radial direction of the portion located on the outer periphery of the non-adhesive part 32 is smaller than a minimum thickness dimension W3 in the radial direction of a portion in the adhesive part 30 that continuously connects the inner shaft member 12 and the outer tube member 14 in the radial direction. On an axial end face of the main rubber elastic body 16, hollow parts 38 and 38 having a concave shape opening in the axial direction are formed over the entire periphery between the inner shaft member 12 and the outer tube member 14 in the radial direction, and a bottom of the hollow parts 38 and 38 reaches the outer periphery of the bulge part 18. Depth, size, shape or the like of the hollow part 38 is not particularly limited. For example, the hollow part 38 may have a depth not reaching the outer periphery of the bulge part 18 from the axial end face of the main rubber elastic body 16. The hollow part 38 may not be necessarily provided.

The suspension bushing 10 having such a structure connects a vehicle body and a suspension arm in a vibration-proof manner by attachment of the inner shaft member 12 to the vehicle body side of a subframe (not shown) or the like and attachment of the outer tube member 14 to the suspension arm side (not shown).

When a vibration in the axis-perpendicular direction (radial direction) is input between the inner shaft member 12 and the outer tube member 14, since the main rubber elastic body 16 is compressed in the axis-perpendicular direction between the inner shaft member 12 and the outer tube member 14, hard spring properties due to a compression spring component are exhibited. In particular, since the bulge part 18 is provided in the inner shaft member 12, and the radial thickness dimension of the main rubber elastic body 16 is reduced on an outer peripheral side of the bulge part 18, hard spring properties can be achieved by compression of the main rubber elastic body 16.

Since the main rubber elastic body 16 is slidable with respect to the non-adhesive part 32 of the inner shaft member 12 including the outer peripheral surface of the bulge part 18, when compressed in the axis-perpendicular direction, the main rubber elastic body 16 tends to be deformed axially outward according to the shape of the outer peripheral surface of the bulge part 18. On both axial sides of the non-adhesive part 32, the adhesive parts 30 and 30 to which the main rubber elastic body 16 is adhered by vulcanization are provided, and the deformation of the main rubber elastic body 16 is restricted at the adhesive parts 30 and 30. Accordingly, the main rubber elastic body 16 located on the outer periphery of the non-adhesive part 32 becomes less likely to be deformed axially outward. By preventing the main rubber elastic body 16 from escaping axially outward, hard spring properties due to the compression in the axis-perpendicular direction are effectively exhibited.

Further, by providing the tapered parts 28 and 28 at both axial ends of the outer tube member 14, axially outward escape of an outer peripheral portion of the main rubber elastic body 16 is suppressed by the tapered parts 28 and 28. Accordingly, hard spring properties in the axis-perpendicular direction can be relatively effectively set.

In the main rubber elastic body 16, a free length of a portion connecting the adhesive part 30 of the inner shaft member 12 and the outer tube member 14 is greater than a free length of a portion connecting the bulge part 18 and the outer tube member 14. Accordingly, the durability of the main rubber elastic body 16 may be improved in the portions where damage is likely to be a problem due to the adhesion to both the inner shaft member 12 and the outer tube member 14.

In the present embodiment, the adhesive part 30 of the inner shaft member 12 is configured to include the inner surface of the recesses 24 and 24, and the free length of the portion in the main rubber elastic body 16 that connects the adhesive part 30 and the outer tube member 14 is ensured to be relatively large by the recess 24. Accordingly, the durability of the portion in the main rubber elastic body 16 that connects the adhesive part 30 of the inner shaft member 12 and the outer tube member 14 may be improved.

When a vibration in the prying direction is input between the inner shaft member 12 and the outer tube member 14, since the main rubber elastic body 16 undergoes shear deformation between the bulge part 18 of the inner shaft member 12 and the outer tube member 14 and the compression spring component is reduced, low spring properties are realized in the prying direction. Since the inner shaft member 12 and the main rubber elastic body 16 are non-adhesive and slidable at the non-adhesive part 32 set on the outer peripheral surface of the bulge part 18, a shear spring component is also reduced and a spring constant in the prying direction is further reduced. By providing the hollow part 38 in an axially outer portion of the main rubber elastic body 16 located between the adhesive part 30 and the outer tube member 14, the compression spring component of the main rubber elastic body 16 is further reduced during prying displacement of the inner shaft member 12 and the outer tube member 14.

When a vibration in the torsional direction is input between the inner shaft member 12 and the outer tube member 14, since the main rubber elastic body 16 undergoes shear deformation between the bulge part 18 of the inner shaft member 12 and the outer tube member 14 and the compression spring component is reduced, low spring properties are realized in the torsional direction. Since the inner shaft member 12 and the main rubber elastic body 16 are non-adhesive and slidable at the non-adhesive part 32 set on the outer peripheral surface of the bulge part 18, a shear spring component is also reduced and a spring constant in the torsional direction is further reduced.

In the present embodiment, the sliding layer 36 having low friction is provided in the non-adhesive part 32 of the inner shaft member 12, and frictional resistance during sliding between the non-adhesive part 32 and the inner peripheral surface of the main rubber elastic body 16 is reduced. Accordingly, low spring properties in the prying direction and the torsional direction can be relatively effectively realized.

Figure 3:
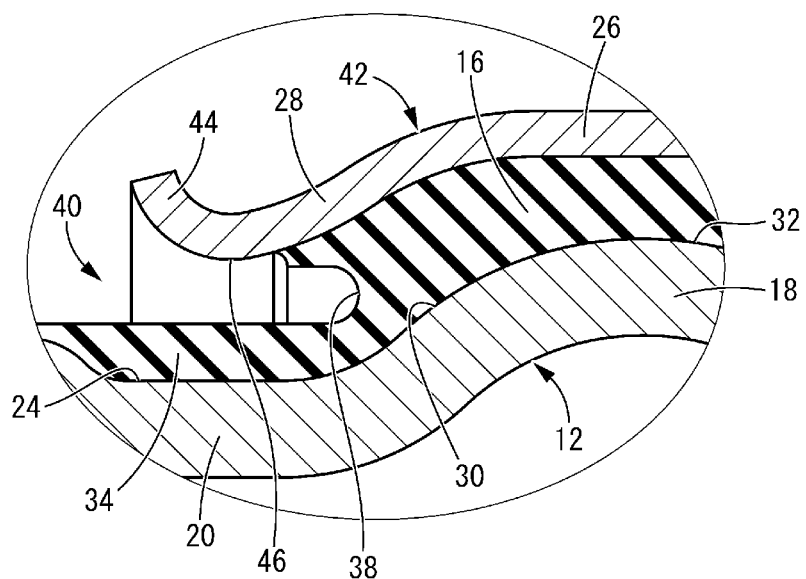
FIG. 3 is a longitudinal sectional view showing a portion of a suspension bushing as a second embodiment of the disclosure.

FIG. 3 shows a portion of a suspension bushing 40 as a second embodiment of the disclosure. The suspension bushing 40 includes an outer tube member 42, and has a structure in which a relief part 44 that curves toward the outer periphery is provided axially outside the tapered part 28 of the outer tube member 42. In the following description, the members and portions substantially the same as those of the first embodiment are designated by the same reference numerals in the drawings, and the description thereof will be omitted.

The relief part 44 is inclined axially outward so as to be located on the outer periphery. The relief part 44 of the present embodiment has a curved sectional shape in which an inclination angle with respect to the axial direction increases axially outward. By providing the relief part 44, an end face of the outer tube member 42 faces the outer peripheral side, and an inner peripheral surface 46 of an axial end of the outer tube member 42 is set as a smooth curved surface without edges. The outer tube member 42 faces the inner fixing part 34 of the main rubber elastic body 16 in the radial direction at the curved inner peripheral surface 46 composed of an end of the tapered part 28 and the relief part 44.

According to the suspension bushing 40 according to the present embodiment like this, an edge of the axial end of the outer tube member 42 can be prevented from coming into contact with the main rubber elastic body 16 when there is a vibration input, and damage to the main rubber elastic body 16 is avoided. By providing the relief part 44 having a curved section at the axial end of the outer tube member 42, deformation rigidity of the outer tube member 42 may be improved.

Although the embodiments of the disclosure have been described in detail above, the disclosure is not limited by the specific description thereof. For example, the adhesive part 30 of the inner shaft member 12 may be a portion of the outer peripheral surface of the small diameter part 20, or may be the entire outer peripheral surface of the small diameter part 20, or may include a portion of the outer peripheral surface of the bulge part 18 in addition to the entire outer peripheral surface of the small diameter part 20. The non-adhesive part 32 of the inner shaft member 12 may be a portion of the outer peripheral surface of the bulge part 18, or may be the entire outer peripheral surface of the bulge part 18, or may include a portion of the outer peripheral surface of the small diameter part 20 in addition to the entire outer peripheral surface of the bulge part 18.

It suffices if the bulge part 18 of the inner shaft member 12 is provided midway in the axial direction of the inner shaft member 12. For example, the bulge part 18 of the inner shaft member 12 may deviate toward either side in the axial direction with respect to an axial center of the inner shaft member 12. It is desirable that the bulge part 18 have an outer peripheral surface shape that is an arc shape in the longitudinal section corresponding to FIG. 1. However, an outer peripheral surface shape that is, for example, a substantially trapezoidal shape, may also be adopted. The recess 24 of the inner shaft member 12 is not essential. The recess 24 may be opened axially outward, for example, with the protrusion 22 omitted, and both ends of the inner shaft member 12 may accordingly have a small diameter up to an end edge.

In the tapered parts 28 and 28 of the outer tube member 14, the inner peripheral surface and the outer peripheral surface may have different inclination angles from each other. For example, in the tapered part, it may be that only the inner peripheral surface is inclined axially outward toward the inner periphery, or is thickened axially outward. The maximum outer diameter R2 of the bulge part 18 of the inner shaft member 12 may be smaller than the minimum inner diameter R1 of the tapered parts 28 and 28 of the outer tube member 14.

For purposes of avoiding interference of the outer tube member 14 at the time of prying input or the like, in the inner shaft member 12 and/or the inner fixing part 34 of the main rubber elastic body 16, a recess may be provided opening in a portion facing an end of the outer tube member 14 and extending in a circumferential direction.

A structure coated with a coating material has been illustrated as an example of the sliding layer 36. However, a sliding layer may also be composed of a sliding liner that is a braided body made of low-friction fibers and is arranged to overlap the non-adhesive part 32 of the inner shaft member 12. The sliding layer is not essential and may be partially provided in at least a portion of the non-adhesive part 32 instead of the entire non-adhesive part 32.

It is possible that the material for forming the main rubber elastic body 16 includes a self-lubricating rubber material in which a surface friction coefficient is reduced by mixing with oil or the like. Accordingly, slidability between the inner shaft member 12 and the main rubber elastic body 16 can further be improved.

The adhesive part 30 may be adhered over the entire surface, and may also be adhered, for example, at predetermined intervals in the circumferential direction, or may be partially adhered in a plurality of regions. Alternatively, in a boundary region between the adhesive part 30 and the non-adhesive part 32, it is possible to provide a partially adhered region or a region where a ratio of adhesive area gradually varies in the axial direction and distribute or transfer a rubber binding force by adhesion. Similarly, the non-adhesive part 32 is not limited to the aspect in which the non-adhesive part 32 is non-adhesive over the entire surface in response to realization of the required spring properties or durability. As can be seen from this, the adhesive part and the non-adhesive part in the disclosure may be interpreted as relative.

In the above embodiment, an example has been shown in which the disclosure is applied to a suspension bushing for an automobile. However, the disclosure is also applicable to a sliding bushing other than a suspension bushing.

What is claimed is:

1. A sliding bushing, having a structure in which an inner shaft member and an outer tube member are connected by a main rubber elastic body and sliding of the inner shaft member with respect to the main rubber elastic body is allowed, wherein
    the inner shaft member comprises a bulge part of a large diameter provided midway in an axial direction;
    the outer tube member comprises a tapered part whose diameter decreases axially outward at both axial end portions;

an outer peripheral surface of the bulge part in the inner shaft member comprises a non-adhesive part that is non-adhesive to the main rubber elastic body and is allowed to slide with respect to the main rubber elastic body, and an outer peripheral surface axially outside the non-adhesive part in the inner shaft member comprises an adhesive part to which the main rubber elastic body is adhered by vulcanization, wherein the adhesive part comprises a first adhesive part and a second adhesive part, and the non-adhesive part is disposed between the first adhesive part and the second adhesive part.

2. The sliding bushing according to claim 1, wherein, in the main rubber elastic body, a minimum thickness dimension in a radial direction of a portion located on an outer periphery of the non-adhesive part is smaller than a maximum thickness dimension in the radial direction of a portion located on an outer periphery of the adhesive part.

3. The sliding bushing according to claim 1, wherein a minimum inner diameter of the tapered part of the outer tube member is smaller than a maximum outer diameter of the bulge part of the inner shaft member.

4. The sliding bushing according to claim 1, wherein a sliding layer having low friction is provided between overlapping surfaces of the non-adhesive part of the bulge part and the main rubber elastic body.

5. The sliding bushing according to claim 1, wherein a recess opening on an outer peripheral surface is provided axially outside the bulge part in the inner shaft member, and the adhesive part is configured to comprise an inner surface of the recess.

\* \* \* \* \*